US009288045B2

United States Patent
Sadot et al.

(10) Patent No.: US 9,288,045 B2
(45) Date of Patent: Mar. 15, 2016

(54) SPECTRAL AND TEMPORAL STEALTHY FIBER OPTIC COMMUNICATION USING SAMPLING AND PHASE ENCODING DETECTION SYSTEMS

(75) Inventors: Dan Sadot, Kfar Bilu (IL); Zeev Zalevsky, Rosh HaAyin (IL); Tomer Yeminy, Ramat Gan (IL)

(73) Assignees: Ben-Gurion University of the Negev Research and Development Authority, Beer Sheva (IL); Bar-Ilan University, Ramat Gan (IL)

( * ) Notice: Subject to any disclaimer, the term of this patent is extended or adjusted under 35 U.S.C. 154(b) by 0 days.

(21) Appl. No.: 14/232,655

(22) PCT Filed: Jul. 17, 2012

(86) PCT No.: PCT/IL2012/000280
§ 371 (c)(1),
(2), (4) Date: Jan. 14, 2014

(87) PCT Pub. No.: WO2013/011500
PCT Pub. Date: Jan. 24, 2013

(65) Prior Publication Data
US 2014/0146969 A1    May 29, 2014

Related U.S. Application Data

(60) Provisional application No. 61/508,702, filed on Jul. 18, 2011.

(51) Int. Cl.
*H04L 9/08*    (2006.01)
*H04B 10/85*    (2013.01)
*H04K 1/04*    (2006.01)
*H04K 1/00*    (2006.01)

(52) U.S. Cl.
CPC .............. *H04L 9/0852* (2013.01); *H04B 10/85* (2013.01); *H04K 1/006* (2013.01); *H04K 1/04* (2013.01)

(58) Field of Classification Search
CPC ........ H04K 1/04; H04K 1/006; H04L 9/0852; H04B 10/85
USPC ......................................................... 380/256
See application file for complete search history.

(56) References Cited

U.S. PATENT DOCUMENTS 7,545,929 B1 *  6/2009  Babb et al. ...................... 380/40
7,831,049 B1 * 11/2010  Kanter .......................... 380/256
2002/0150242 A1 * 10/2002 Javidi et al. ..................... 380/54

(Continued)

*Primary Examiner* — Kambiz Zand
*Assistant Examiner* — Benjamin Kaplan
(74) *Attorney, Agent, or Firm* — Roach Brown McCarthy & Gruber, P.C.; Kevin D. McCarthy

(57) ABSTRACT

A method for providing spectral and temporal stealthy information transmitted over an optical communication channel, according to which, at the transmitting side, the power spectral density of a pulse sequence bearing the information is reduced by encrypting the temporal phase of the pulse sequence. The power of the pulse sequence is spread in the frequency domain, to be below the noise level, by sampling the pulse sequence. Spectral phase encoding is used to temporally spread the pulse sequence and to prevent coherent addition of its spectral replicas in frequency domain. The resulting signal, encrypted both in time and frequency domains, is then transmitted. Spectral phase decoding is performed at the receiving side by performing coherent detection and folding all the spectral replicas of the transmitted signal to the baseband by means of sampling. The temporal phase of the signal is decrypted and the information which is delivered by the pulse sequence is decoded.

7 Claims, 5 Drawing Sheets

(56) References Cited

U.S. PATENT DOCUMENTS

| | | | |
|---|---|---|---|
| 2006/0193027 A1* | 8/2006 | Dorrer et al. | 359/279 |
| 2011/0066025 A1* | 3/2011 | Bahn | 600/410 |
| 2012/0093209 A1* | 4/2012 | Schmidt et al. | 375/224 |

* cited by examiner

SPECTRAL AND TEMPORAL STEALTHY FIBER OPTIC COMMUNICATION USING SAMPLING AND PHASE ENCODING DETECTION SYSTEMS

FIELD OF THE INVENTION

The present invention relates to the field of secure optical data communication. More particularly, the invention relates to a method and system for providing spectral and temporal stealthy fiber optic communication, by using sampling and phase encoding.

BACKGROUND OF THE INVENTION

The rapid spread of optical communication systems has increased the need for proper security solutions, in order to prevent eavesdropping and jamming. Existing Spread Spectrum encryption techniques are considered to be appropriate for optical communication systems, due to their large bandwidth which enables to achieve high processing gain [1]. In addition, methods for encrypting transmission using Optical Coherent Optical Code-Division Multiple-Access (OCDMA) are proposed in [2-4]. According to these methods, the signal is encrypted in the time domain using a dispersive element which encodes the spectral phase of the signal. By implementing the approaches presented in [5,6], the temporal phase of the dispersed signal is encoded using a Temporal Phase Encoder (TPE), thereby assigning different phase to each spectral component. However, by using these encryption methods while transmitting outside the bandwidth of a public channel, the spectral concealment of the signal is not always assured since, the signal is not necessarily spectrally hidden under the noise level. If the signal is not concealed in the frequency domain, an adversary that coherently detects and samples the signal can perform Discrete Fourier Transform (DFT) and disclose the spectral amplitude of the signal. Therefore, the transmitted signal is not spectrally stealthy.

All the methods described above failed to propose a method and system for providing stealthy fiber optic communication, which prevents eavesdropping and jamming both in spectral and temporal domains.

It is an object of the present invention to provide a method that allows transmitting a signal with reduced power spectral density.

It is another object of the present invention to provide a method that allows transmitting a signal, while keeping it below the noise level in the frequency domain.

Other objects and advantages of the invention will become apparent as the description proceeds.

SUMMARY OF THE INVENTION

The present invention is directed to a method for providing spectral and temporal stealthy information transmitted over a fiber optic communication channel, comprising:

At the transmitting side:
a) reducing the power spectral density of a pulse sequence bearing the information by encrypting the temporal phase of the pulse sequence, thereby preventing the coherent addition of the temporal pulses in the frequency domain;
b) spreading the power of the pulse sequence in the frequency domain, to be below the noise level, by sampling the pulse sequence;
c) performing spectral phase encoding to temporally spread the pulse sequence and to prevent the coherent addition of the spectral replicas by an eavesdropper;
d) transmitting the resulting signal, encrypted both in time and frequency domains, such that the transmitted signal is below the noise level in both domains;

At the receiving side:
e) performing spectral phase decoding;
f) performing coherent detection;
g) folding all the spectral replicas of the transmitted signal to the baseband by means of sampling, thereby coherently adding all its spectral replicas at the baseband and reinforcing the PSD of the signal;
h) decrypting the temporal phase of the signal; and
i) decoding the information which is delivered by the pulse sequence.

The information carrying signal may be encrypted by:
a) multiplying each pulse is by a different temporal phase term;
b) sampling the pulse sequence to obtain its spectral spreading in the frequency domain by a sampler; and
c) encrypting the spectral phase of the signal, in order to spread its amplitude below the noise level in time domain and to prevent coherent addition of its spectral replicas in frequency domain; and
d) amplifying the amplitude of the signal, by an amplifier (e.g., an Erbium doped fiber amplifier).

The received signal may be decrypted by:
a) performing optical spectral phase decoding followed by coherent detection;
b) sampling the received signal and folding all its spectral replicas to fold into the baseband, where they are coherently added;
c) passing the added replicas through a matched filter;
d) decoding the temporal phase of the received signal; and
e) sampling the signal; and
f) recovering the original bit sequence by means of a decision circuit that performs coherent detection, followed by low pass filtering.

The decryption may include dispersion compensation followed by spectral phase decoding. An analog sampler may be implemented by a modulator that transmits a burst of the optical signal.

The present invention is directed to a system for providing spectral and temporal stealthy information transmitted over a fiber optic communication channel, that comprises:
a) A transmitter that includes:
  a.1) a Temporal Phase Encoder for reducing the power spectral density of a pulse sequence bearing the information by encrypting the temporal phase of the pulse sequence, thereby preventing the coherent addition of the pulses in the frequency domain;
  a.2) a sampler for spreading the power of the pulse sequence in the frequency domain, to be below the noise level, by sampling the pulse sequence;
  a.3) a Spectral Phase Encoder for performing spectral phase encoding to temporally spread the pulse sequence and prevent coherent addition of its spectral replicas in frequency domain;
  a.4) circuitry transmitting the resulting signal, encrypted both in time and frequency domains;
b) A receiver that includes:
  b.1) a Spectral Phase Decoder for performing spectral phase decoding followed by a coherent detector;
  b.2) a sampling circuitry for folding all the spectral replicas of the transmitted signal to the baseband followed by a matched filter; and b.3) a Temporal Phase Decoder followed by a decision circuit, for reconstructing the PSD of the transmitted signal; and b.4) a sampler followed by a decision circuit decoding the information delivered by the pulse sequence.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The system proposed by the present invention is related to a method for encrypting fiber-optic communications in both frequency and time domains. The encryption method proposed by the present invention is based on encrypting the temporal phase of the pulse sequence, thereby reducing its power spectral density. The power spectral density of the pulse sequence bearing the information is spread in the frequency domain below the noise level by means of sampling. In addition, temporal phase encryption prevents the coherent addition of the various pulses in the frequency domain, so as to further reduce the signal power spectral density. This way, there is no need to transmit the signal within the bandwidth of a public user in order to spectrally conceal the signal. Temporal spreading of the pulse sequence is achieved by spectral phase encoding, resulting in a stealthy temporal and spectral transmission. Spectral phase encryption is subsequently applied to spread the signal in the time domain and prevent the eavesdropper from observing the signal in the frequency domain by coherently adding its spectral replicas at the baseband. Hence, at the end of the encryption process, the pulse sequence is spread below the noise level in the time and frequency domains.

According to the proposed encryption method, the spectral amplitude of the signal is deliberately spread wide, essentially enabling transmitting a signal with low power spectral density (PSD), while keeping the signal's power below the noise level in the frequency domain. The spectral spreading is achieved by sampling the signal. At the receiver, all the spectral replicas of the signal are folded to the baseband. Therefore, the PSD of the signal is reconstructed and in turn, the Signal to Noise Ratio (SNR) is improved. This is achieved by coherently adding all the signal's spectral replicas at the baseband (hence the signal is reinforced) whereas the spectral replicas of the noise are added incoherently (consequently they are averaged to a low value).

When an information source 11 generates a bit sequence which modulates an optical carrier with frequency $f_c$, the modulation results in the pulse sequence s(t), which should be encrypted both in time and frequency domains. Each pulse p(t) in the sequence has a pulse width T and a double sided bandwidth $\Delta f$. The gap between two sequential pulses in the time domain is $\Delta t$, satisfying $\Delta t \geq T$.

Figure 1:
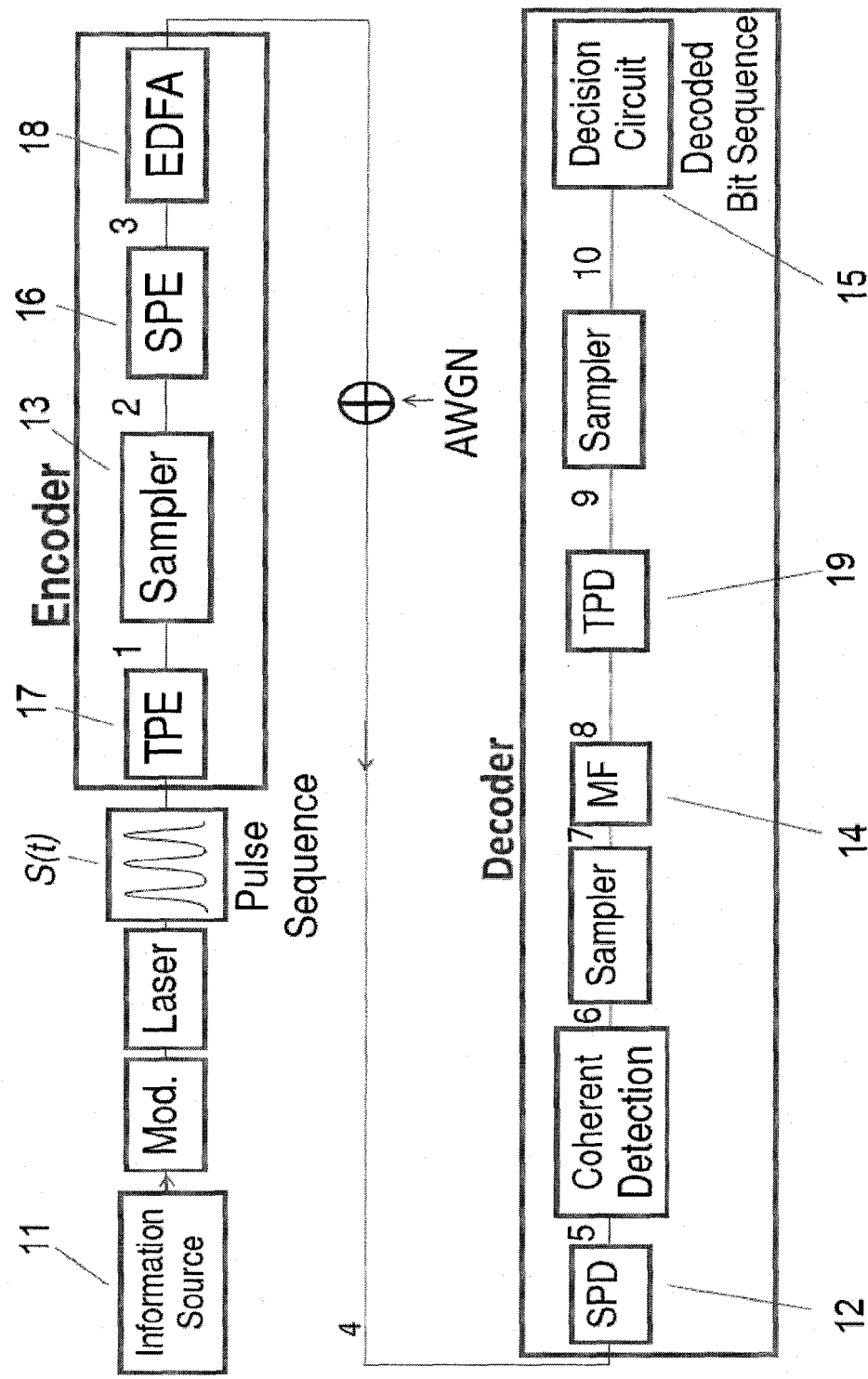
FIG. 1 illustrates an analog implementation of the proposed communication channel, according to a preferred embodiment of the invention.
Figure 2:
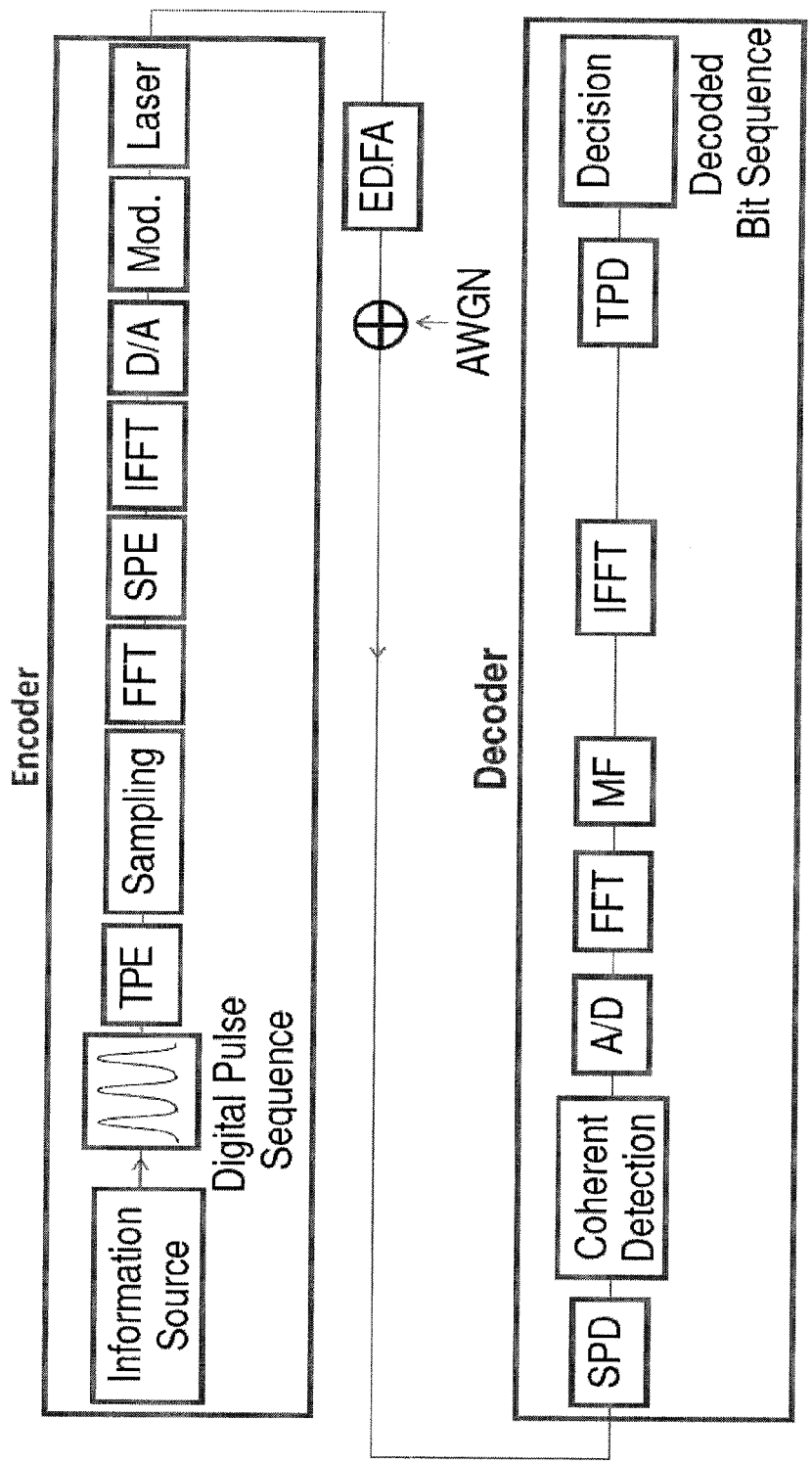
FIG. 2 illustrates a digital implementation of the proposed communication channel, according to a preferred embodiment of the invention.

A digital implementation of the proposed communication system is illustrated in FIG. 2. For the simplicity of the mathematical analysis, an equivalent analog system is discussed and presented in FIG. 1.

At the first stage, each pulse is multiplied by a different temporal phase term. Accordingly, the addition of the Fourier Transform (FT) of the various pulses in the signal bandwidth is incoherent, thus reducing the PSD of s(t). Then, a sampler 13 with sampling frequency $\Delta f$ is applied to have M=BW/$\Delta f$ spectral replicas of the signal in the frequency domain, where BW is the communication system bandwidth. An analog sampler can be implemented by a modulator that transmits a burst of the optical signal, each 1/$\Delta f$ Sec. In addition, the spectral phase of the signal is optically encoded, thereby spreading the signal in the time domain. Finally, the signal's amplitude is amplified by $\sqrt{M}$ in order to compensate for the attenuation of the spectral amplitude of the signal stemming from the spectral spreading of the signal due to the sampling. White Gaussian noise n(t) (Additive White Gaussian Noise—AWGN) is added due to amplification and channel noises. The signal spreading in time and frequency domains keeps it below the noise level in both domains.

The proposed decryption process begins with optical spectral phase decoding, followed by coherent detection. The signal is subsequently sampled at sampling frequency $\Delta f$ in order to fold all its spectral replicas to the baseband where they are coherently added. Then, a filter 14 matched to p(t) is applied. Finally, the temporal phase of the signal is decoded by a Temporal Phase Decoder (TPD) 19 and the signal is sampled with sampling interval $\Delta t$. The original bit sequence is recovered by a decision circuit 15.

Encoder Configuration

When a bit sequence modulates an optical carrier, a pulse sequence is generated and represented by the analytical signal:

$$s(t) = \sum_{n=1}^{N} a_n p(t - n\Delta t) e^{j2\pi f_c t} = b(t) e^{j2\pi f_c t} \qquad \text{(Eq. 1)}$$

where $\{a_n\}_{n=1}^{N}$ are statistically independent Bernoulli distributed random variables with equally probable values 0 and 1, p(t) is real and $$b(t) = \sum_{n=1}^{N} a_n p(t - n\Delta t) \qquad \text{(Eq. 2)}$$

is the baseband pulse sequence carried by the optical carrier.

The temporal phase of the signal is encoded with the following phase:

$$\rho(t) = \sum_{n=1}^{N} \Phi_n rect\left(\frac{t - n\Delta t}{\Delta t}\right) \qquad \text{(Eq. 3)}$$

Hence, the analytical signal at point 1 in FIG. 1 resulting from the temporal phase encoding is:

$$s_1(t) = s(t)e^{j\rho(t)} \quad \text{(Eq. 4)}$$
$$= \sum_{n=1}^{N} a_n e^{j\Phi_n} p(t - n\Delta t)e^{j2\pi f_c t}$$
$$= b_1(t)e^{j2\pi f_c t}$$

where the phases $\{\Phi_n\}_{n=1}^{N}$ encoding the temporal phase of the pulse sequence can get $Q_t$ possible values, equally spaced between 0 and $2\pi$, and:

$$b_1(t) = \sum_{n=1}^{N} a_n e^{j\Phi_n} p(t - n\Delta t) \quad \text{(Eq. 5)}$$

is the temporal phase encoded baseband pulse sequence having FT $B_1(f)$. The FT of $s_1(t)$ is $S_1(f)=B_1(f-f_c)$.

The signal is subsequently sampled, yielding the analytical signal $s_2(t)$ at point 2. If the bandwidth of the communication system is BW, the sampled signal has the following FT:

$$S_2(f) = \frac{1}{\sqrt{M}} \sum_{m=-(M-1)/2}^{(M-1)/2} S_1(f - m\Delta f) \quad \text{(Eq. 6)}$$
$$= \frac{1}{\sqrt{M}} \sum_{m=-(M-1)/2}^{(M-1)/2} B_1(f - m\Delta f - f_c)$$

where $M=BW/\Delta f$ is the number of spectral replicas of $S_1(f)/\sqrt{M}$ in the frequency domain, generated due to the sampling.

Then, the spectral phase of the signal is encoded by a Spectral Phase Encoder (SPE) 16. A Fast Fourier Transform (FFT) is performed at the input to the SPE 16 and an Inverse Fast Fourier Transform (IFFT) is performed at the output of the SPE 16.

The spectral phase encoding has two goals. The first goal is signal spreading in the time domain, in order to conceal it under the noise level. The second goal is to prevent reconstruction of the signal spectral amplitude by an eavesdropper that samples the signal in order to coherently add its spectral replicas at the baseband, while the spectral replicas of the noise are added incoherently. The spectral phase encryption turns the addition of the spectral replicas to incoherent addition. This way, the signal is kept bellow the noise level in the frequency domain.

The phase encrypting the spectral frequency of the signal has the following form in the positive frequency domain:

$$\psi(f) = \sum_{k=-(K-1)/2}^{(K-1)/2} \varphi_k \, rect\left(\frac{f - k\delta f - f_c}{\delta f}\right) \quad \text{(Eq. 7)}$$

Where $K=BW/\delta f$ is the number of phase bins in the communication system bandwidth and $\{\phi_k\}_{k=-(K-1)/2}^{(K-1)/2}$ getting $Q_f$ possible values equally spaced between 0 and $2\pi$. In addition:

$$rect(f) = \begin{cases} 1 & |f| \leq 1/2 \\ 0 & |f| > 1/2 \end{cases} \quad \text{(Eq. 8)}$$

The spectral phase encoding can be implemented by the method described in [7] based on the one proposed in [8]. This method seems to be more suitable for the approach proposed by the present invention, rather than other methods [9-11] due to the high spectral bandwidth, resolution and addressability it enables. In addition, this spectral phase encoding makes the encryption of many Wavelength-Division Multiplexing (WDM) channels, at once, possible.

Consequently, the spectral phase encoded analytical signal at point 3, $s_3(t)$ has FT:

$$S_3(f) = S_2(f)e^{j\psi(f)} \quad \text{(Eq. 9)}$$
$$= \frac{e^{j\psi(f)}}{\sqrt{M}} \sum_{m=-(M-1)/2}^{(M-1)/2} S_1(f - m\Delta f)$$

An Erbium doped fiber amplifier is then used to amplify the signal by $\sqrt{M}$, in order to compensate for the attenuation of the signal's spectral amplitude stemming from the spectral spreading of the signal due to the sampling.

After transmission, white Gaussian noise n(t) with autocorrelation $R_n(t)=\sigma^2\delta(t)$ and FT N(f) is added to the signal, due to amplifier and channel noises. Since N(f) is a white Gaussian noise with autocorrelation $R_N(f)=\sigma^2\delta(f)$, the noise is represented by the analytical signal $n_A(t)$ having FT 2u(f) N(f) where u(f) is the step function:

$$u(f) = \begin{cases} 1 & f \geq 0 \\ 0 & f < 0 \end{cases} \quad \text{(Eq. 10)}$$

Thus, the analytical signal $s_A(t)$ at point 4 is:

$$s_4(t) = \sqrt{M} s_3(t) + n_A(t) \quad \text{(Eq. 11)}$$

with FT:

$$S_4(f) = \sqrt{M} S_3(f) + 2u(f)N(f) \quad \text{(Eq. 12)}$$
$$= e^{j\psi(f)} \sum_{m=-(M-1)/2}^{(M-1)/2} S_1(f - m\Delta f) + 2u(f)N(f)$$

The signal spreading in the time and frequency domains keeps the signal below the noise level, resulting in a stealthy signal in both domains.

Decoder Configuration

The decryption process begins with dispersion compensation followed by spectral phase decoding. Chromatic dispersion can be either compensated by dispersion compensating fibers or can be avoided by using dispersion shifted fibers for transmission. Polarization Mode Dispersion (PMD) can be compensated using the coherent method offered in [9]. The PMD compensation dynamics should be in the sub-MHz rate and thus can be compensated after the decryption process when the bit rate is reduced to $\Delta f$ (which typically has the magnitude of a few GHz). Spectral phase decoding can be optically implemented by a Spectral Phase Decoder (SPD) 12, which multiplies the FT of the analytical signal with $e^{-j\psi(f)}$. The bandwidth of the SPD is BW, giving rise to the analytical signal $s_5(t)$ at point 5, with FT:

$$S_5(f) = S_4(f) rect\left(\frac{f-f_c}{BW}\right) e^{j\psi(f)} \quad \text{(Eq. 13)}$$

$$= = \sum_{m=-(M-1)/2}^{(M-1)/2} S_1(f - m\Delta f) +$$

$$2N(f) rect\left(\frac{f-f_c}{BW}\right) e^{-j\psi(f)}$$

The signal is then coherently detected and passed through a low pass filter with bandwidth BW, yielding the electrical analytical signal $s_6(t)$ at point 6 which has FT:

$$S_6(f) = \frac{1}{2} S_5(f + f_c) = \quad \text{(Eq. 14)}$$

$$= \frac{1}{2}\left[\sum_{l=-(M-1)/2}^{(M-1)/2} B_1(f - m\Delta f) + 2N(f + f_c) rect\left(\frac{f}{BW}\right) e^{-j\psi(f+f_c)}\right]$$

Using the following notations for the detected noise and spectral phase encoding:

$$N_d(f) = N(f+f_c) \quad \text{(Eq. 15)}$$

$$\psi_d(f) = \psi(f+f_c) \quad \text{(Eq. 16)}$$

Eq. 14 can be written as:

$$S_6(f) = S_5(f + f_c) = \quad \text{(Eq. 17)}$$

$$= \frac{1}{2}\left[\sum_{m=-(M-1)/2}^{(M-1)/2} B_1(f - m\Delta f) + 2N_d(f) rect\left(\frac{f}{BW}\right) e^{-j\psi_d(f)}\right]$$

A sampler having a transfer function with bandwidth BW and sampling frequency $\Delta f$ is subsequently applied to fold the spectral replicas of the signal to the baseband, resulting in the analytical signal $s_7(t)$ at point 7. The FT of the signal is:

$$S_7(f) = S_6(f) * \frac{1}{\sqrt{M}} \sum_{l=-(M-1)/2}^{(M-1)/2} \delta(f - l\Delta f) = \quad \text{(Eq. 18)}$$

$$= \frac{1}{2\sqrt{M}} \sum_{l=-(M-1)/2}^{(M-1)/2} \sum_{m=-(M-1)/2}^{(M-1)/2} B_1(f - m\Delta f - l\Delta f) +$$

$$\frac{1}{2\sqrt{M}} \sum_{l=-(M-1)/2}^{(M-1)/2} 2N_d(f - l\Delta f) rect\left(\frac{f-l\Delta f}{BW}\right) e^{-j\psi_d(f-l\Delta f)}$$

where * denotes the convolution operator.

Then, a filter matched to p(t) filters $s_7(t)$. Consequently, the signal $s_8(t)$ is achieved at point 8 having FT:

$$S_8(f) = S_7(f) P^*(f) = \quad \text{(Eq. 19)}$$

$$= \frac{P^*(f)}{2\sqrt{M}} \sum_{l=-(M-1)/2}^{(M-1)/2} \sum_{m=-(M-1)/2}^{(M-1)/2} B_1(f - m\Delta f - l\Delta f) ++$$

$$\frac{P^*(f)}{2\sqrt{M}} \sum_{l=-(M-1)/2}^{(M-1)/2} 2N_d(f - l\Delta f) rect\left(\frac{f-l\Delta f}{BW}\right) e^{-j\psi_d(f-l\Delta f)}$$

Since the bandwidth of P*(f) is limited to the baseband, all the cross terms in Eq. 19 are zeroed, and therefore, only the terms with l=m are left. Thus, Eq. 19 turns to:

$$S_8(f) = \frac{P^*(f)}{2\sqrt{M}} \sum_{m=-(M-1)/2}^{(M-1)/2} B_1(f) + + \frac{P^*(f)}{2\sqrt{M}} \quad \text{(Eq. 20)}$$

$$\sum_{m=-(M-1)/2}^{(M-1)/2} 2N_d(f - m\Delta f) rect\left(\frac{f-m\Delta f}{BW}\right) e^{-j\psi_d(f-m\Delta f)}$$

Hence:

$$S_8(f) = \frac{P^*(f)}{2\sqrt{M}} MB_1(f) + \quad \text{(Eq. 21)}$$

$$\frac{P^*(f)}{2\sqrt{M}} \sum_{m=-(M-1)/2}^{(M-1)/2} 2N_d(f - m\Delta f) rect\left(\frac{f-m\Delta f}{BW}\right) e^{-j\psi_d(f-m\Delta f)}$$

The first term at the right side of Eq. 21 denotes the signal, whereas the right term denotes the noise. Multiplying these terms by $\sqrt{M}$, the first term linearly increases with M since it comprises M spectral replicas of the signal, which are coherently added at the baseband and filtered by the matched filter. The noise term does not linearly increase with M, since the spectral noise shifts are added incoherently. This distinction between the decoded signal and the noise will be further expressed later when the SNR, of the decoded signal is derived.

The temporal phase of the signal is then decoded. Hence, the analytical signal at point 9 is:

$$s_9(t) = e^{-j\rho(t)} \int_{-\infty}^{\infty} S_8(f) e^{j2\pi ft} df = \qquad (\text{Eq. 22})$$

$$= e^{-j\rho(t)} \int_{-\infty}^{\infty} \frac{P^*(f)}{2} \sqrt{M} B_1(f) e^{j2\pi ft} df + e^{-j\rho(t)} \int_{-\infty}^{\infty} \frac{P^*(f)}{2\sqrt{M}} \cdot \cdot$$

$$\sum_{m=-(M-1)/2}^{(M-1)/2} 2N_d(f - m\Delta f) rect\left(\frac{f - m\Delta f}{BW}\right)$$

$$e^{-j\psi_d(f - m\Delta f)} e^{j2\pi ft} df$$

The following notations are used:

$$\tilde{s}_A(t) = e^{-j\rho(t)} \int_{-\infty}^{\infty} \frac{P^*(f)}{2} \sqrt{M} B_1(f) e^{j2\pi ft} df \qquad (\text{Eq. 23})$$

$$\tilde{n}_A(t) = \qquad (\text{Eq. 24})$$

$$e^{-j\rho(t)} \int_{-\infty}^{\infty} \frac{P^*(f)}{2\sqrt{M}} \cdot \cdot \sum_{m=-(M-1)/2}^{(M-1)/2} 2N_d(f - m\Delta f) rect\left(\frac{f - m\Delta f}{BW}\right)$$

$$e^{-j\psi_d(f - m\Delta f)} e^{j2\pi ft} df$$

where $\tilde{s}_A(t)$ and $\tilde{n}_A(t)$ are the analytical signal and noise terms at point 9 respectively.

Eq. 23 can be further developed to yield:

$$\tilde{s}_A(t) = e^{-j\rho(t)} \int_{-\infty}^{\infty} \frac{P^*(f)}{2} \sqrt{M} B_1(f) e^{j2\pi ft} df \qquad (25)$$

$$= \frac{\sqrt{M}}{2} e^{-j\rho(t)} \int_{-\infty}^{\infty} p^*(\tau - t) \sum_{n=1}^{N} a_n e^{j\Phi_n} p(\tau - n\Delta t) d\tau$$

It should be noted that:

$$\tilde{s}_A(n\Delta t) = \frac{\sqrt{M}}{2} e^{-j\rho(t)} \int_{-\infty}^{\infty} p^*(\tau - n\Delta t) \sum_{k=1}^{N} a_k e^{j\Phi_k} p(\tau - k\Delta t) d\tau = \qquad (\text{Eq. 26})$$

$$= \frac{\sqrt{M}}{2} \sum_{l=1}^{N} e^{-j\Phi_l} rect\left(\frac{n\Delta t - l\Delta t}{\Delta t}\right) \int_{-\infty}^{\infty} p^*(\tau - n\Delta t)$$

$$\sum_{k=1}^{N} a_k e^{j\Phi_k} p(\tau - k\Delta t) d\tau =$$

$$= \frac{\sqrt{M}}{2} a_n E_p$$

where:

$$E_p \equiv \int_{-\infty}^{\infty} |p(t)|^2 dt \qquad (\text{Eq. 27})$$

The signal $s_9(t)$ is sampled each temporal interval $\Delta t$, generating the sampled signal $s_{10}(t)$ at point 10:

$$s_{10}(t) = \begin{cases} s_9(n\Delta t) = \tilde{s}_A(n\Delta t) + \tilde{n}_A(n\Delta t) & t = n\Delta t \\ 0 & \text{otherwise} \end{cases} \qquad (\text{Eq. 28})$$

where n is an integer. A decision circuit is then applied to recover the original bit sequence.

Expected Performances

Having the signal and noise expressed in Eq. 26 and Eq. 24 respectively, the SNR and the bit error rate (BER) measured by an authorized user after signal decryption are subsequently derived.

SNR After Decryption

The SNR of the decrypted signal is given by:

$$SNR = \frac{(\tilde{s}(n\Delta t))^2}{E[(\tilde{n}(n\Delta t))^2]} \qquad (\text{Eq. 29})$$

where the following notations are used:

$$\tilde{s}(t) = Re\{\tilde{s}_A(t)\} \qquad (\text{Eq. 30})$$

$$\tilde{n}(t) = Re\{\tilde{n}_A(t)\} \qquad (\text{Eq. 31})$$

From Eq. 26 it can be seen that:

$$\tilde{s}(n\Delta t) = Re[\tilde{s}_A(n\Delta t)] \qquad (\text{Eq. 32})$$

$$= \frac{\sqrt{M}}{2} a_n E_p$$

Assuming the SNR is measured at time $t=n\Delta t$, for which $a_n=1$, Eq. 32 gives:

$$\tilde{s}(n\Delta t) = \frac{\sqrt{M}}{2} E_p \qquad (\text{Eq. 33})$$

Therefore, the signal power is:

$$(\tilde{s}(n\Delta t))^2 = \left(\frac{\sqrt{M}}{2} E_p\right)^2 \qquad (\text{Eq. 34})$$

$$= \frac{M}{4} E_p^2$$

In addition:

$$E[(\tilde{n}(t))^2] = E[(Re\{\tilde{n}_A(t)\})^2] = \qquad (\text{Eq. 35})$$

$$= E\left[\left(\frac{1}{2}\{\tilde{n}_A(t) + \tilde{n}_A^*(t)\}\right)^2\right] =$$

-continued $$= \frac{1}{4}E[(\tilde{n}_A(t))^2] + \frac{1}{2}E[\tilde{n}_A(t) + \tilde{n}_A^*(t)] + \frac{1}{4}E[(\tilde{n}_A^*(t))^2]$$

Using Eq. 24, it can be shown that $E[(\tilde{n}_A(t))^2] = E[(\tilde{n}_A^*(t))^2] = 0$. Hence:

$$E[(\tilde{n}(t))^2] = \frac{1}{2}E[\tilde{n}_A(t)\tilde{n}_A^*(t)] \quad \text{(Eq. 36)}$$

$$= \frac{\sigma^2}{2M} \int_{-\infty}^{\infty} \sum_{m=-(M-1)/2}^{(M-1)/2} |P(f)|^2 df$$

$$= \frac{\sigma^2}{2}E_p$$

Therefore, the SNR measured after decryption is:

$$SNR = \frac{|\tilde{s}(n\Delta t)|^2}{E[(\tilde{n}(n\Delta t))^2]} \quad \text{(Eq. 37)}$$

$$= \frac{\frac{M}{4}E_p^2}{\frac{\sigma^2}{2}E_p}$$

$$= M\frac{E_p}{2\sigma^2}$$

The term $E_p/\sigma^2$ is the SNR for the case of a baseband pulse sequence transmitted without going through the encoder, and simply detected by a matched filter, followed by a sampler and a decision circuit. This term is multiplied by factor M, since the M spectral replicas of the signal are added coherently, while the addition of the M spectral shifts of the noise is incoherent. The factor 2 at the denominator is due to the modulation of the baseband signal with the optical carrier having frequency $f_c$, which doubles the transmission bandwidth, and therefore, doubles the noise power, as well.

Before decryption, the signal is hidden below the noise level in the time domain, since low power original (i.e. unencrypted) pulses can be used due to the processing gain (which is given in Eq. 37, to increase the SNR of the decrypted signal by factor M for the case of an authorized user) resulting from the coherent addition of the signal's spectral replicas. In addition, the signal's peak power is further lowered since it is spread in the time domain due to the spectral phase encryption. If the sampled signal at point 2 in FIG. 1 has a bandwidth BW and the spectral phase code resolution is δf, there are BW/δf chips in the frequency domain, which results in spreading the samples in the time domain by factor BW/δf. Since the Erbium Doped Fiber Amplifier (EDEA) 18 amplifies the sampled signal by a factor M, the peak power of the samples will be lowered by factor BW/(M·δf)=Δf/δf, where Δf is the bandwidth of the original pulse. Since the original signal is wider than its samples by factor M in the time domain, its peak power is lowered by factor Δf/(M·δf) due to the spectral phase encoding.

BER After Decryption

Since the decoder is a linear system, the noise after the decryption process remains Gaussian. The average of the sampled noise at point 10 in FIG. 1 is:

$$E[\tilde{n}(t)] = \frac{1}{2}E[\tilde{n}_A(t) + \tilde{n}_A^*(t)] \quad \text{(Eq. 38)}$$

$$= 0$$

The variance of the noise is given by Eq. 36.

The BER for the case of a Gaussian noise is given by:

$$BER = \frac{1}{2}erfc\left(\frac{\sqrt{SNR}}{2\sqrt{2}}\right) \quad \text{(Eq. 39)}$$

Using Eq. (37), the BER is:

$$BER = \frac{1}{2}erfc\left(\frac{\sqrt{SNR}}{2\sqrt{2}}\right) \quad \text{(Eq. 40)}$$

$$= \frac{1}{2}erfc\left(\frac{1}{2\sqrt{2}}\sqrt{M\frac{E_p}{2\sigma^2}}\right)$$

$$= \frac{1}{2}erfc\left(\frac{1}{4}\sqrt{M\frac{E_p}{\sigma^2}}\right)$$

Hiding the Signal in the Frequency Domain

If an optical signal is processed by a spectrum analyzer and coherent detection yields the electrical signal v(t) (measured in Volts), the FT of v(t) is v(f). The PSD of v(t) is:

$$G_v(f) = \frac{1}{\tilde{T}}|V(f)|^2 \quad \text{(Eq. 41)}$$

The motivation for this definition is that $df=1/\tilde{T}$ is the spectral resolution of the signal v(t). Hence, the voltage content of the signal in frequency f can be found by locating a BPF with bandwidth $1/\tilde{T}$ at frequency f. The amplitude of the filtered signal, passing through an envelope detector will be $V(f)df=V(f)/\tilde{T}$ (measured in Volts). Its power will be $P_v(f)=|V(f)df|^2=|V(f)/\tilde{T}|^2$ (measured in Watts, assuming that the load over which the voltage of the signal was measured has 1Ω resistance). $P_v(f)$ is the power content of v(t) within bandwidth $df=1/\tilde{T}$ in frequency f which is measured by the spectrum analyzer. The PSD in frequency f is therefore $$G_v(f) = P_v(f)/df = \frac{1}{\tilde{T}}|V(f)|^2.$$

$|V(f)|^2$ is the energy spectral density (ESD) of v(t), with units of J/Hz. When v(t) is a random process, its ESD is defined as the ensemble average of $|V(f)|^2$. It is required to estimate the PSD of the signal and the noise measured by an adversary trying to reveal the cloaked signal in the frequency domain by means of coherently detecting and sampling the signal, in order to fold its spectral replicas to the baseband. Ensuring a stealthy transmission in the frequency domain is an advantage of the proposed method over the prior art methods described in [2-6]. According to Eq. 1, the duration of the pulse sequence is $\tilde{T}=N\Delta t$.

The encrypted signal was shown in Eq. 12 to be:

$$S_4(f) = e^{j\psi(f)} \sum_{m=-(M-1)/2}^{(M-1)/2} S_1(f - m\Delta f) + 2u(f)N(f) \quad \text{5}$$

Applying a band pass filter (BPF) with bandwidth BW at the carrier frequency, the analytical signal becomes:

$$S_4(f) = e^{j\psi(f)} \sum_{m=-(M-1)/2}^{(M-1)/2} S_1(f - m\Delta f) + 2\text{rect}\left(\frac{f-f_c}{BW}\right)N(f) \quad \text{(Eq. 42)}$$

Considering the finite duration of the noise in the time domain, Eq. (42) becomes:

$$S_4(f) = e^{j\psi(f)} \sum_{m=-(M-1)/2}^{(M-1)/2} S_1(f - m\Delta f) + 2\text{rect}\left(\frac{f-f_c}{BW}\right) \quad \text{(Eq. 43)}$$

$$\{N(f) * [N\Delta t \text{sinc}(f \cdot N\Delta t)\exp(-j2\pi f \cdot N\Delta t/2)]\}$$

Coherently detecting $s_4(t)$ and applying a low pass filter with bandwidth BW without spectral phase decryption yields the signal $\hat{s}_5(t)$ with FT:

$$\hat{S}_5(f) = \quad \text{(Eq. 44)}$$

$$\frac{1}{2}e^{j\psi(f+f_c)} \sum_{m=-(M-1)/2}^{(M-1)/2} B_1(f - m\Delta f) + + \left\{\text{rect}\left(\frac{f-f_c}{BW}\right)[N(f) *$$

$$(N\Delta t\text{sinc}(f \cdot N\Delta t)e^{-j\pi f \cdot N\Delta t})]\right\} * \delta(f+f_c)$$

Sampling the detected signal yields the signal $\hat{s}_6(t)$ with FT:

(Eq. 45)

$$\hat{S}_6(f) = \hat{S}_5(f) * \frac{1}{\sqrt{M}} \sum_{l=-(M-1)/2}^{(M-1)/2} \delta(f - l\Delta f)$$

$$= \frac{1}{2\sqrt{M}} \sum_{m=-(M-1)/2}^{(M-1)/2} \sum_{l=-(M-1)/2}^{(M-1)/2} B_1(f - m\Delta f - l\Delta f)e^{j\psi(f+f_c-l\Delta f)} +$$

$$\frac{N\Delta t}{\sqrt{M}} \sum_{l=-(M-1)/2}^{(M-1)/2} \text{rect}\left(\frac{f-l\Delta f}{BW}\right) \cdot \cdot$$

$$\int_{-\infty}^{\infty} N(f_1)\text{sinc}((f+f_c-l\Delta f - f_1)\cdot N\Delta t)e^{-j\pi(f+f_c-l\Delta f-f_1)\cdot N\Delta t} df_1$$

Finally, applying a matched filter results in the signal $\hat{s}_7(t)$ having FT:

(Eq. 46)

$$\hat{S}_7(f) = \hat{S}_6(f)P^*(f) =$$

$$= \frac{P^*(f)}{2\sqrt{M}} \sum_{m=-(M-1)/2}^{(M-1)/2} B_1(f)e^{j\psi(f+f_c-m\Delta f)} + +$$

$$\frac{N\Delta t P^*(f)}{\sqrt{M}} \sum_{l=-(M-1)/2}^{(M-1)/2}$$

$$\int_{-\infty}^{\infty} N(f_1)\text{sinc}((f+f_c-l\Delta f - f_1)\cdot N\Delta t)e^{-j\pi(f+f_c-l\Delta f-f_1)\cdot N\Delta t} df_1$$

The PSD of the signal is therefore:

(Eq. 47)

$$G_s(f) = \frac{1}{N\Delta t}E\left[\left|\frac{P^*(f)}{2\sqrt{M}}B_1(f)\sum_{m=-(M-1)/2}^{(M-1)/2} e^{j\psi(f+f_c-m\Delta f)}\right|^2\right] =$$

$$= \frac{|P(f)|^2}{4MN\Delta t}\left|\sum_{m=-(M-1)/2}^{(M-1)/2} e^{j\psi(f+f_c-m\Delta f)}\right|^2$$

$$\sum_{n=1}^{N}\sum_{l=1}^{N} E[a_n a_l]e^{j(\Phi_n - \Phi_l)}e^{j2\pi f(n-l)\Delta t} =$$

$$= \frac{|P(f)|^4}{8MN\Delta t}\left[\sum_{m=-(M-1)/2}^{(M-1)/2}\sum_{l\neq m} e^{-j[\psi(f+f_c-m\Delta f)-\psi(f+f_c-l\Delta f)]} + M\right]$$

$$\left[\sum_{n=1}^{N}\sum_{l\neq 1}\frac{1}{2}e^{j(\Phi_n-\Phi_l)}e^{j2\pi f(n-l)\Delta t} + N\right]$$

When $\{\phi_k\}_{k=-(K-1)/2}^{(K-1)/2}$ and $\{\phi_n\}_{n=1}^{N}$ are statistically independent and uniformly distributed between 0 and $2\pi$, the following approximation is done:

$$G_s(f) \approx \frac{1}{8MN\Delta t}|P(f)|^4 MN = \frac{1}{8\Delta t}|P(f)|^4 \quad \text{(Eq. 48)}$$

The PSD of the noise is:

(Eq. 49)

$$G_n(f) = \frac{1}{N\Delta t}E\left(\left|\left\{\text{rect}\left(\frac{f-f_c}{BW}\right)[N(f)*(N\Delta t\text{sinc}(f\cdot N\Delta t)e^{-j\pi f\cdot N\Delta t})]\right\}*\delta(f+f_c)\right|^2\right) ==$$

$$\frac{1}{N\Delta t}E\left[\left|\frac{N\Delta t P^*(f)}{\sqrt{M}}\cdot\cdot\sum_{l=-(M-1)/2}^{(M-1)/2}\int_{-\infty}^{\infty} N(f_1)\text{sinc}((f+f_c-l\Delta f - f_1)\cdot N\Delta t)e^{-j\pi(f+f_c-l\Delta f-f_1)\cdot N\Delta t} df_1\right|^2\right] ==$$

-continued $$\frac{(N\Delta t)^2|P(f)|^2\sigma^2}{MN\Delta t}\sum_{l=-(M-1)/2}^{(M-1)/2}\sum_{m=-(M-1)/2}^{(M-1)/2}\int_{-\infty}^{\infty}\text{sinc}((f+f_c-l\Delta f-f_1)\cdot N\Delta t)\cdots\sin c((f+f_c-m\Delta f-f_1)\cdot N\Delta t)e^{j\pi(l-m)\Delta f\cdot N\Delta t}df_1$$

In addition, $\Delta f>>(N\Delta t)^{-1}$. Hence, noting $\tilde{f}\equiv f+f_c$, the following approximation is used:

sin c$((\tilde{f}-m\Delta f-f_1)\cdot N\Delta t)$sin c$((\tilde{f}-l\Delta f-f_1)\cdot N\Delta t)\approx$sin c$^2[(\tilde{f}-m\Delta f-f_1)\cdot N\Delta t]\delta_{m,l}$ (Eq. 50)

Thus, Eq. 49 becomes:

$$G_n(f)\approx\frac{N\Delta t|P(f)|^2\sigma^2}{M}\sum_{m=-(M-1)/2}^{(M-1)/2}\frac{1}{N\Delta t}=\sigma^2|P(f)|^2 \quad\text{(Eq. 51)}$$

Consequently, the spectral SNR measured by the eavesdropper is:

$$SNR_E(f)=\frac{G_s(f)}{G_n(f)}\approx\frac{\frac{1}{8\Delta t}|P(f)|^4}{\sigma^2|P(f)|^2}=\frac{|P(f)|^2}{8\sigma^2\Delta t} \quad\text{(Eq. 52)}$$

The spectral SNR experienced by the adversary increases with $|P(f)|^2$. Having M spectral replicas of the signal, this term can be attenuated by factor M due to the processing gain resulting from the coherent addition of the spectral replicas. Hence, taking a large number of spectral replicas allows reducing the power of the pulses in the transmitted pulse sequence. In addition, the spectral SNR decreases with $\sigma^2$ which is the white Gaussian noise double sided PSD and with $\Delta t$, which is the temporal interval between two sequential pulses. Enlarging this interval immerses the signal more deeply in the spectral noise.

Eq. 52 implies that the spectral SNR measured by the adversary depends neither on the number of pulses in the pulse sequence, nor in the number of the signal spectral replicas. The independence of the number of pulses is achieved due to the temporal phase encryption, which prevents the coherent addition of the various pulses in the pulse sequence at the baseband. In addition, the independence of the number of spectral replicas results from the spectral phase encryption which prevents the coherent addition of the signal's spectral replicas at the baseband.

Simulation and Results

Simulated System Configuration

The generated simulation realizes the system described in FIG. 1 with the following parameters:

Number of pulses in a single analyzed pulse sequence—N=500.

Pulse sequence duration—1 μsec.

Temporal gap between two sequential pulses—$\Delta t$=2 nsec.

Temporal pulse width—T=0.5 nsec. Taking T=$\Delta t$ results in degradation of the SNR and BER after decoding due to inter-symbol interference.

Pulse bandwidth—$\Delta f$=5 GHz

Transmission bandwidth—BW=80 GHz (unless noted otherwise). Current analog to digital converters used for coherent detection are limited to bandwidth of about 50 GHz.

Additive white Gaussian noise double sided PSD—$\sigma^2$=0.2 mw/MHz.

Quantization level of the temporal phase encoding—$Q_t$=64.

Quantization level of the spectral phase encoding—$Q_f$=64.

Spectral resolution of spectral phase encoding—$\Delta f$=200 MHz.

The modulating format of the pulse sequence was on-off-keying. Each pulse in the sequence has a raised cosine shape in the time domain with rolloff factor $\alpha$=0.25 [12]. The temporal and spectral phases encoding the pulse sequence are uniformly distributed between 0 and $2\pi$.

A sequence of one million pulses (which is composed of 2000 pulse sequences, each having N=500 pulses) was run in order to evaluate the BER after decryption.

Results

The SNR used for the original baseband pulse passing through a matched filter was $E_p/\sigma^2$=10. The SNR and BER of the decoded pulse sequence were examined for various values of the transmission bandwidth BW. Their expected values are given in Eq. 37 and Eq. 40, respectively.

Figure 3:
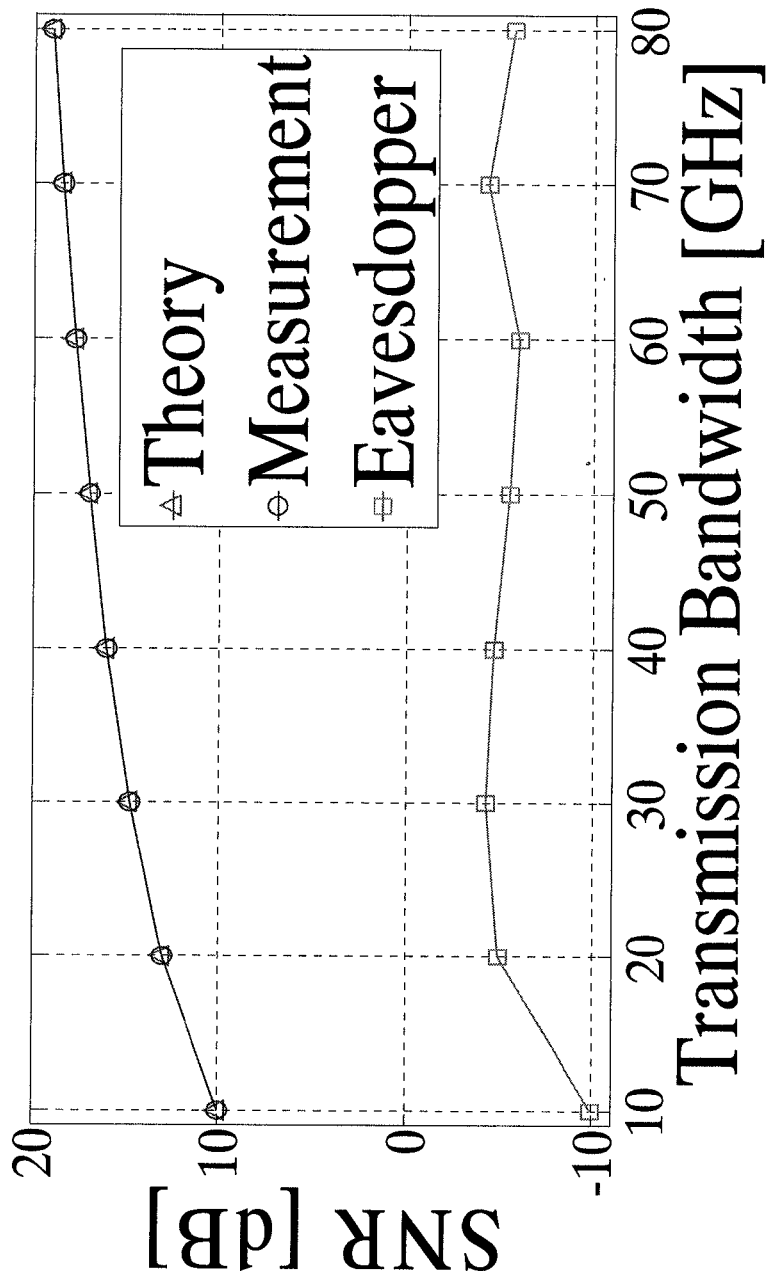
FIG. 3 illustrates the SNR after decoding for the authorized user and an adversary.

FIG. 3 illustrates the SNR after decoding. The theoretical SNR matches the one measured by the simulation. In addition, an adversary trying to recover the signal with randomly chosen temporal and spectral encoding phases, having the same quantization, temporal and spectral resolution as the authorized user was simulated. It is shown that the eavesdropper experiences very low SNR since signal is spread below the noise level. The SNR measured by the adversary varies with the transmission bandwidth, since various spectral slices of the Spectral Phase Encoder (SPE) 16 are used, therefore influencing the matching between the Spectral Phase Decoder (SPD) 12 of the authorized user and the eavesdropper.

Figure 4:
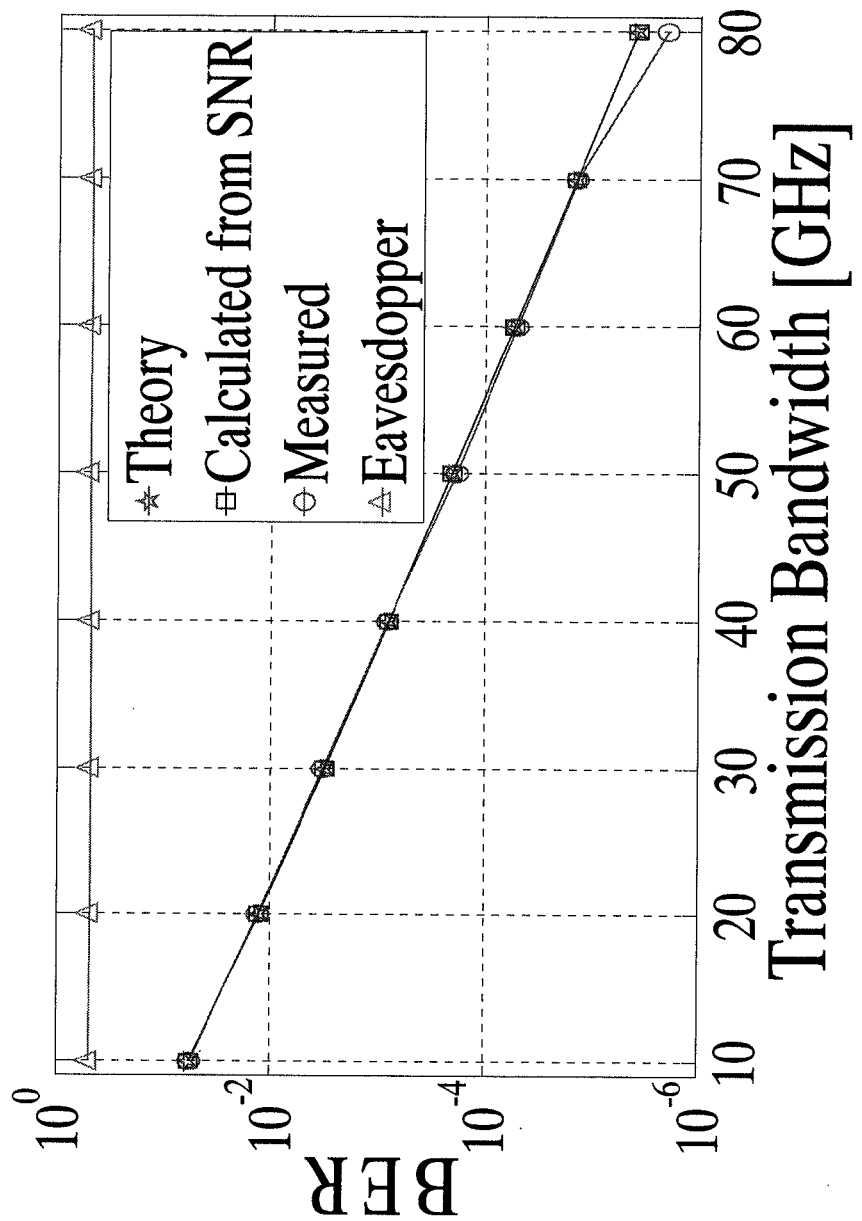
FIG. 4 illustrates BER after decoding for the authorized user and an adversary.

The BER after decoding is illustrated in FIG. 4. Three graphs are used for the authorized user. The first graph denotes the theoretical BER. The second graph exhibits the BER calculated by substituting the measured SNR from FIG. 3 in Eq. 40. The third one is the BER measured by the simulation. It should be noted that the deviation of the measured BER from the two other BER graphs (the theoretical graph and the one calculated from the SNR) for the case of an authorized user with transmission bandwidth of 80 GHz stems from the limited statistics of the simulation. While the expected BER is about $10^{-5.5}$, only $10^6$ pulses are run by the simulation, hence the number of measured erroneous bits is lower than that expected by the two other graphs. The BER measured by the adversary is very high (about 0.5). The threshold chosen for the eavesdropper is half the maximal power of its received noiseless signal.

Figure 5:
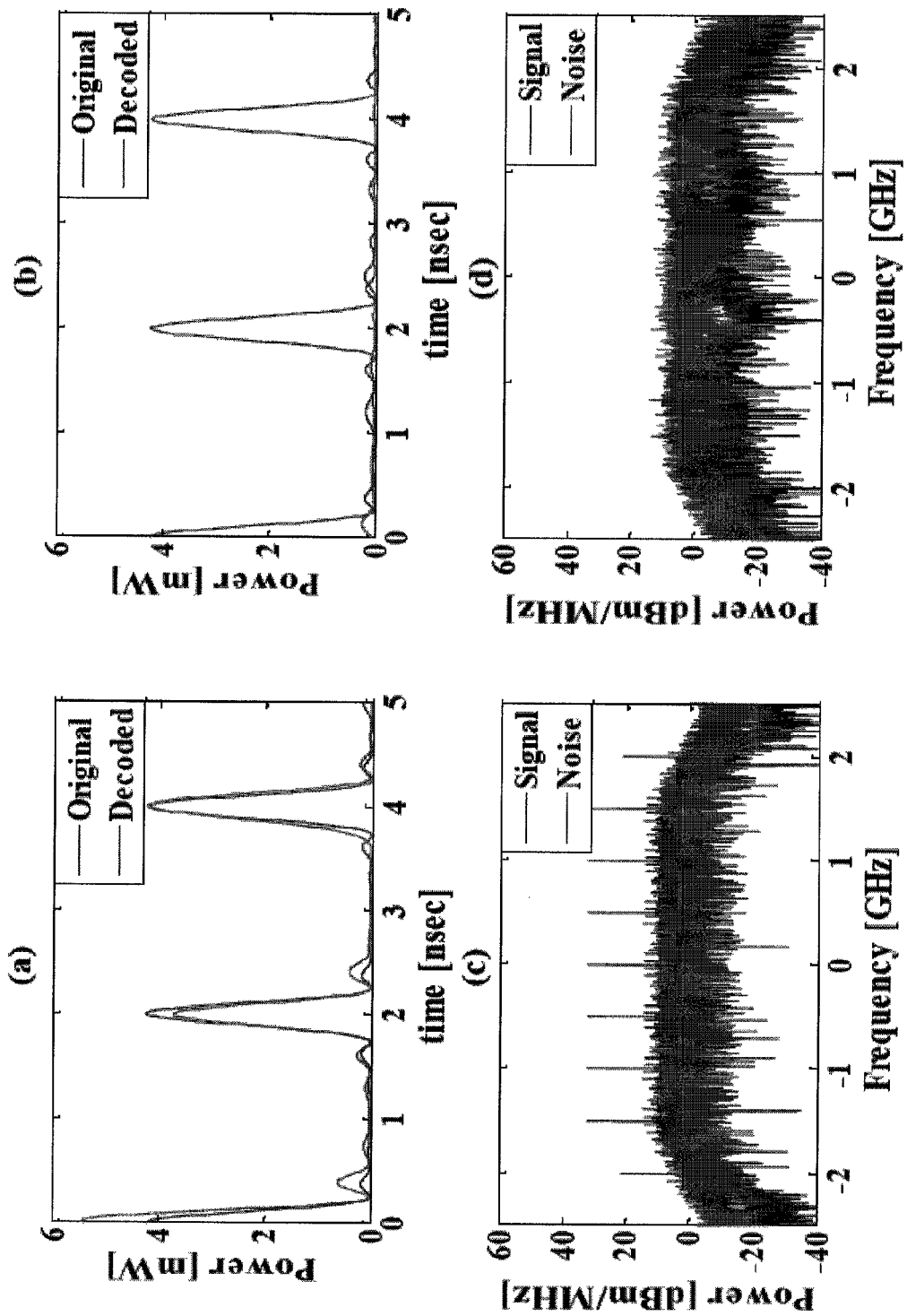
FIG. 5 illustrates the decoded pulse sequence in time and frequency domains for the authorized user and the adversary.

FIG. 5 shows the decoded pulse sequence in time and frequency domains for the authorized user and the adversary. The transmission bandwidth is BW=80 GHz. FIGS. 5(a) and (b) present a 5 nsec interval of the noiseless original pulse sequence and the noisy decoded pulse sequence passed through a matched filter for the authorized user and the eavesdropper, respectively. The eavesdropper cannot observe the signal while the authorized user can easily detect it. FIGS. 5(c) and (d) exhibit the PSD normalized by 1/(N$\Delta t$), measured by the authorized user and the adversary respectively for a single pulse sequence consisting of 500 pulses. In the first case, the signal is well raised above the noise level while being significantly lower than the noise PSD for the latter due to the incoherent addition of the spectral replicas and incorrect temporal phase decoding, which prevents the coherent addition of the various temporal pulses in the frequency domain.

Encryption Strength Estimation

In order to evaluate the encryption strength the following assumptions are made:

- The SNR used for the original baseband pulse passing through a matched filter was $E_p/\sigma^2=4$ (corresponding to SNR=18 dB and BER=$10^{-4.5}$ after authorized decryption).
- The goal of the eavesdropper is to raise the signal above the noise level in either time or frequency domain.
- The eavesdropper has a-priory knowledge about the encryption and decryption method. The only parameters that should be guessed are the temporal and spectral phase codes.
- The eavesdropper tries to deduce the spectral and temporal phase codes by working with roughly quantized temporal and spectral phase codes.
- The eavesdropper needs to properly guess at least $N_t$ and $N_f$ temporal and spectral phases in order to reveal the signal in either time or frequency domain.
- When observing the signal, the adversary tries to refine the phase quantization of the guessed phases in order to improve the measured SNR and BER.
- The encryption strength is defined as the time interval needed to accomplish the goal of the eavesdropping process.
- The eavesdropper has the same spectral and temporal phase decoders as the authorized user. The maximal SPD's SLM update frequency of the eavesdropper is: $f_{SEM}=1$ MHz.

First, we assume that the adversary begins with binary quantized temporal and spectral phases and that the temporal phase code is already known. Tries are made by the adversary to get SNR>0 dB in the time domain. Second, temporal phase quantization $Q_t=64$ is assumed.

The simulation shows that the spectral resolution of the spectral phase code has major influence over the number of spectral phases needed for the eavesdropper to properly guess in order to reveal the signal in the time domain. Larger spectral resolution results in a higher $N_f$. For example, using 100 different randomly chosen spectral phase codes for the authorized user and the eavesdropper with $Q_f=256$ (which are already commercial) and $\delta f=100$ MHz, the mean value observed for $N_f$ was 158 with standard deviation of 33.33. Spectral phase encoding with $\delta f=100$ MHz can be achieved by using an SLM with 8 μm pitch pixels (which is commercially available) instead of 15 μm in the SPE proposed in [7]. Reducing the spectral phase code resolution to $\delta f=200$ MHz, the average $N_f$ became 76 with standard deviation of 23.14.

$N_f$ is also affected by the number of spectral phase code quantization levels $Q_f$. A larger $Q_f$ results in a larger $N_f$. For instance, when working with $\delta f=200$ MHz, $Q_f=2$, the average required $N_f$ reduced to 51.1 with standard deviation of 21.07.

The time interval required for the adversary to get SNR>0 dB in the time domain is give by:

$$T_{eav} = \frac{(Q_{f,eav})^{N_f}}{f_{SLM}} \quad \text{(Eq. 52)}$$

where $Q_{f,eav}$ is the spectral phase quantization level of the spectral phase code used by the eavesdropper. The assumed value is $Q_{f,eav}=2$ (having no prior knowledge about the spectral phase code of the authorized user, it was observed that eavesdropping with larger $Q_{f,eav}$ only increases $T_{eav}$, hence the eavesdropper is assumed to start with binary quantization).

For the case of $\delta f=100$ MHz and $Q_f=256$, substituting $N_f=125$, Eq. 52 gives:

$$T_E = 2^{N_f}/f_{SLM} = 2^{125}/10^6 \text{ Hz} = 1.35 \cdot 10^{24} \text{ years}$$

While for $\delta f=200$ MHz and $Q_f=256$, substituting $N_f=53$, yields:

$$T_E = 2^{N_f}/f_{SLM} = 2^{53}/10^6 \text{ Hz} = 285.6 \text{ years}$$

And $\delta f=200$ MHz, $Q_f=2$, resulting in $N_f=30$ gives:

$$T_E = 2^{N_f}/f_{SLM} = 2^{30}/10^6 \text{ Hz} = 3.4 \cdot 10^{-5} \text{ years}$$

Thus, the spectral resolution and quantization level of the phase code strongly affect the encryption strength. It should be noted that the above estimated $N_f$ is actually a lower bound for the number of spectral phases needed to be properly guessed in order to accomplish positive SNR in the time domain since it was assumed that the temporal phase code is completely known to the adversary.

$N_t$ can be found by estimating the number of temporal phases needed to be properly guessed by an adversary using a binary quantized temporal phase decoder, in order to raise the signal above the noise level in the frequency domain after properly guessing $N_f$ spectral phases with the binary quantized SPD. For example, a spectral phase code and an adversary SPD yielding $N_f=210$ were chosen ($\Delta f=100$ MHz). The peak of the spectral SNR became positive at $N_t=320$.

Hence, using high resolution and highly quantized phase decoding, the encryption system can cause the eavesdropping process involving a "brute force" attack in which the temporal and spectral phase codes are randomly guessed to last a very long time interval in order to raise the signal above the noise level in time and frequency domains. This time interval is irrelevant for the eavesdropper.

A second kind of possible attack is such that the eavesdropper is assumed to determine the original unencrypted signal known as "Chosen-plaintext attack" [13]. The encryption methods proposed in [2-4] enable the spectral phase code disclosure when the eavesdropper sends a known pulse sequence from the encoder of the authorized user when the signal is not concealed under the transmission of a public WDM user. The spectral phase of the sent pulse sequence is known to the eavesdropper, hence, the spectral phase code is revealed. The temporal phase encrypting the signal in the methods described in [5,6] can be disclosed by sending a narrowband pulse for which the effect of the dispersion is insignificant. The resulting encoded signal is the original signal having its temporal phase encoded. This way, the temporal phase code can be measured by the adversary. The spectral phase code can then be disclosed similarly to methods [2-4]. However, using the encryption method proposed by the present invention, the pulse sequence is well spread below the noise level in the frequency domain as well as in the time domain, thereby making the recovery of the spectral phase code much more difficult.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

REFERENCES

1. A. J. Viterbi, "Spread spectrum communications—myths and realities," IEEE Commun. Mag. 17, 11-18 (1979).
2. B. B. Wu and E. E. Narimanov, "A method for secure communications over a public fiber-optical network," Opt. Express 14, 3738-3751 (2006).
3. K. Kravtsov, B. Wu, I. Glysk, P. R. Prucnal and E. Narimanov: "Stealth transmission over a WDM network with detection based on an all-optical thresholder", in *Proceedings of IEEE Conference on Lasers and Electro-Optics* (IEEE, New York, 2007), pp. 480-481.
4. B. Wu, A. Agarwal, I. Glesk, E. Narimanov, S. Etemad, and P. R. Prucnal, "Steganographic Fiber-Optic Transmission Using Coherent Spectral-Phase-Encoded Optical CDMA," in *Conference on Lasers and Electro-Optics/Quantum Electronics and Laser Science Conference and Photonic Applications Systems Technologies*, OSA Technical Digest (CD) (Optical Society of America, 2008), paper CFF5. http://www.opticsinfobase.org/abstract.cfm?URI=CLEO-2008-CFF5
5. Z. Wang, M. P. Fok, L. Xu, J. Chang, and P. R. Prucnal, "Improving the privacy of optical steganography with temporal phase masks," Opt. Express 18, 6079-6088 (2010).
6. Zhensen Gao, Xu Wang, Nobuyuki Kataoka, and Naoya Wada, "Stealth Transmission of Time-Domain Spectral Phase Encoded OCDMA Signal Over WDM Network," IEEE Photon. Technol. Lett. 22, 993-995 (2010).
7. D. Sinefeld, C. R. Doerr, and D. M. Marom, "Photonic Spectral Processor Employing Two-Dimensional WDM Channel Separation and a Phase LCoS Modulator," in *Optical Fiber Communication Conference*, OSA Technical Digest (CD) (Optical Society of America, 2010), paper OMP5. http://www.opticsinfobase.org/abstract.cfm?URI=OFC-2010-OMP5
8. D. Sinefeld and D. M. Marom, "Hybrid Guided-Wave/Free-Space Optics Photonic Spectral Processor Based on LCoS Phase Only Modulator," IEEE Photon. Technol. Lett. 22, 510-512 (2010).
9. Ezra Ip and Joseph M. Kahn, "Digital Equalization of Chromatic Dispersion and Polarization Mode Dispersion," Journal of Lightwave Technology 25, 2033-2043 (2007).
10. Xu Wang, "Novel Time Domain Spectral Phase Encoding/Decoding Technique for OCDMA Application," in *International Conference on Transparent Optical Networks* (IEEE, S. Miguel (Portugal), 2009), paper Th.A3.4.
11. Xu Wang and Naoya Wada, "Spectral phase encoding of ultra-short optical pulse in time domain for OCDMA application," Opt. Express 15, 7319-7326 (2007).
12. Daisuke Miyamoto and Hiroyuki Tsuda, "Spectral Phase Encoder Employing an Arrayed-Waveguide Grating and Phase-Shifting Structure," IEEE Photon. Technol. Lett. 19, 431-433 (2007).
13. J. G. Proakis and M. Salehi, *Communication systems engineering* (Prentice Hall, N.J., 1994), Chap. 8.
14. Yann Frauell, Albertina Castro, Thomas J. Naughton and Bahram Javidi, "Resistance of the double random phase encryption against various attacks", Opt. Express 15, 10253-10265 (2007).

The invention claimed is:

1. A method for providing spectral and temporal stealthy information transmitted over an optical communication channel, comprising:

at the transmitting side:
 a) reducing the power spectral density of a pulse sequence bearing said information by encrypting the temporal phase of said pulse sequence, thereby preventing the coherent addition of the temporal pulses in the frequency domain;
 b) spreading the power of said pulse sequence in the frequency domain, to be below the noise level, by sampling said pulse sequence;
 c) performing spectral phase encoding to temporally spread said pulse sequence and to prevent coherent addition of its spectral replicas in frequency domain;
 d) transmitting the resulting signal, encrypted both in time and frequency domains, such that the transmitted signal is below the noise level in both domains;

at the receiving side:
 e) performing spectral phase decoding;
 f) performing coherent detection;
 g) folding all the spectral replicas of the transmitted signal to the baseband by means of sampling, thereby coherently adding all its spectral replicas at the baseband and reinforcing the PSD of the signal;
 h) decrypting the temporal phase of the signal, thereby coherently adding the temporal pulses of the pulse sequence at the baseband and reconstructing the PSD of the signal; and
 i) using a decision unit for recovering said information.

2. A method according to claim 1, wherein the information carrying signal is encrypted by:
 a) multiplying each pulse by a different temporal phase term;
 b) sampling the pulse sequence to obtain its spectral spreading in the frequency domain by a sampler; and
 c) encrypting the spectral phase of the signal, in order to spread its amplitude below the noise level in time domain and to prevent coherent addition of its spectral replicas in frequency domain;
 d) amplifying the amplitude of said signal, by an amplifier, to compensate for the attenuation of the spectral amplitude of said signal.

3. A method according to claim 1, wherein the received signal is decrypted by:
 a) performing optical spectral phase decoding followed by coherent detection;
 b) sampling the received signal and folding all its spectral replicas into the baseband, where they are coherently added, thereby reinforcing the PSD of the signal;
 c) passing the added replicas through a matched filter;
 d) decoding the temporal phase of the received signal, thereby reconstructing the PSD of the signal;
 e) sampling the signal;
 f) recovering the original bit sequence by means of a decision circuit.

4. A method according to claim 1, wherein the decryption includes dispersion compensation followed by spectral phase decoding.

5. A method according to claim 1, wherein the analog sampler is implemented by a modulator that transmits a burst of the optical signal.

6. A method according to claim 1, wherein the amplifier is an Erbium doped fiber amplifier.

7. A system for providing spectral and temporal stealthy information transmitted over an optical communication channel, comprising:
 a) a transmitter that includes:
  a.1) a Temporal Phase Encoder for reducing the power spectral density of a pulse sequence bearing said information by encrypting the temporal phase of said pulse sequence, thereby preventing the coherent addition of the temporal pulses in the frequency domain;

a.2) a sampler for spreading the power of said pulse sequence in the frequency domain, to be below the noise level, by sampling said pulse sequence;

a.3) a Spectral Phase Encoder for performing spectral phase encoding to temporally spread said pulse sequence and to prevent the coherent addition of its spectral replicas in frequency domain;

a.4) circuitry transmitting the resulting signal, encrypted both in time and frequency domains;

b) a receiver that includes:

b.1) a Spectral Phase Decoder for performing spectral phase decoding followed by a coherent detector;

b.2) a sampling circuitry for folding all the spectral replicas of the transmitted signal to the baseband, hence coherently adding all of its spectral replicas at the baseband and reinforcing the PSD of the signal; and b.3) a Temporal Phase Decoder, for reconstructing the PSD of the transmitted signal; and b.4) a sampler followed by a decision circuit which decodes the information that is delivered by the pulse sequence.

* * * * *